Aug. 23, 1960 J. J. BIRCHFIELD 2,949,670
LAWN EDGER
Filed July 10, 1958
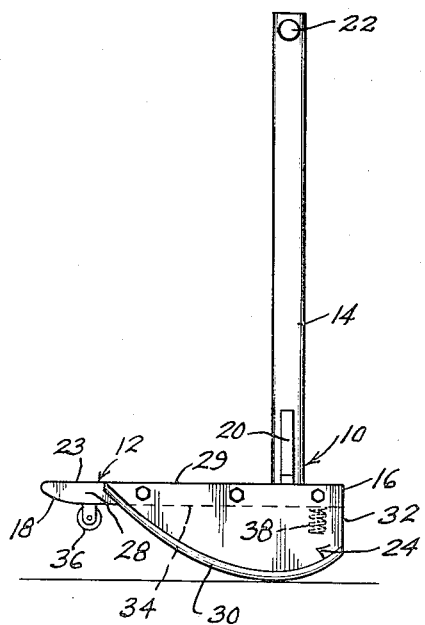
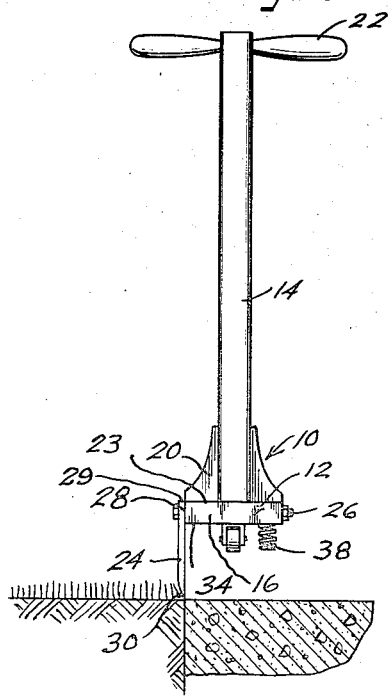
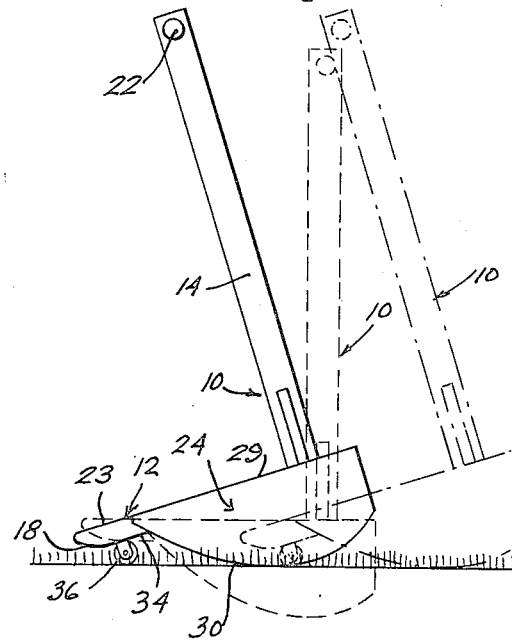
Inventor
Jesse J. Birchfield
by Hill, Sherman, Meroni, Gross & Simpson Attys.

2,949,670
LAWN EDGER
Jesse J. Birchfield, 4571 McCrory Road, Memphis, Tenn.

Filed July 10, 1958, Ser. No. 747,627

4 Claims. (Cl. 30—315)

This invention relates to a lawn edger adapted to trim the edge of a lawn adjacent a sidewalk or the like, and more particularly to a lawn edger which may be rocked forward in use without the need for retracting and repositioning the edger after each cutting action thereof.

Heretofore, various types of lawn edgers have been available which have provided a platform for the foot of the user to assist in driving a cutting blade secured in depending relationship to the platform, together with a handle fixed in upstanding relationship to the platform, but such edgers have generally required that the tool be retracted and reinserted, or otherwise laboriously moved forward, with each cutting action. The present invention overcomes the aforementioned difficulties by providing a platform for the user's foot which has a handle extending upwardly therefrom at the front portion of the platform and a cutter secured to the bottom of the platform along one side thereof or otherwise along the bottom face by means of an angle bracket or the like, the cutter blade defining an edge which has a predetermined cutting depth for a major portion of its length and which extends arcuately upwardly toward the rear thereof. The platform is likewise given an arcuate configuration at its rear edge, and after the cutter has been depressed, by grasping the handle and pressing on the platform with the foot, it may be rocked or pivoted toward the user by means of the arcuate rear platform edge and blade edge and thereupon moved forwardly without extracting the device from the groove made by the cutting action, to afford continuously self-aligning action. In order to assist in the forward movement of the edger, a roller element such as a small wheel is journalled to the bottom rear surface of the platform adjacent the arcuate edge thereof and likewise, a spring means may be secured to the bottom of the platform to cooperate with the hand action in rocking the cutter about the fulcrum defined by the rear edge of the platform to an angle relative to the ground which permits its to be rolled forward easily as described.

Accordingly, it is an object of the present invention to provide a lawn edger wherein a sequential rocking and rolling action is afforded which permits the guided movement of the blade along a predetermined edging line without the need for continuous retraction and insertion of the blade and with a minimum of effort.

Another object of the invention is to provide a lawn edger as described wherein a platform carries an upstanding handle structure and a depending cutter blade, the handle being preferably spaced forwardly on the platform and the platform having an arcuate rear edge portion so that the entire structure may be rocked or pivoted upwardly about the arcuate rear edge upon completion of an individual cutting movement and thereupon moved forward.

Another object of the invention is to provide a lawn edger as described wherein the depending blade is given a substantially arcuate configuration wherein a predetermined depth is afforded along a major portion thereof from its front end and the rear portion is curved arcuately upwardly to assist in the aforementioned rocking action.

Another object of the invention is to provide a lawn cutter as described in which roller means are journalled on the platform adjacent the rear edge thereof, whereby the device may be rolled forwardly to the next cutting position after it has been rotated about the said rear edge to a position in which the platform and the blade extend upwardly at a predetermined angle relative to the surface being edged.

Yet another object of the invention is to provide a cutter as described having a depending spring means secured to the forward bottom surface of the platform for assisting in rocking the device to the said upwardly inclined position.

Other objects and advantages of the invention will become apparent as the description proceeds in accordance with the drawings in which:

Figure 1 is a side elevational view of an edger according to the invention;

Figure 2 is an end elevational view of the edger of the invention; and

Figure 3 is a side elevational view, somewhat in diagrammatic form, showing the operation of the edger.

Referring now to Figures 1–3, the lawn edger 10 of the invention includes a preferably substantially rectangular foot piece or platform 12 which may be made of metal, wood, or other suitable material. An elongated handle 14, likewise formed of any suitable material such as metal, wood or the like, is fixedly secured to the foot piece or platform 12 in preferably perpendicular relationship thereto and adjacent the forward edge 16 of the platform in predetermined spaced relationship thereto, and to the rear edge 18 by means of a brace 20 or the like, although it will be understood that any suitable means may be provided for this purpose. The upper end of the handle 14 carries a transverse handle bar structure 22 extending in parallel relationship to the platform 12 and substantially at right angles to the longitudinal axis thereof as shown. The spacing of the handle 14 from the rear edge 18 is such that the surface 23 of the platform in back of the handle will provide a foot rest for use in pressing the cutter into the ground.

The rear edge 18 of the platform 12 is formed in a downwardly and inwardly arcuate configuration as hereinafter further described, and a planar blade 24 is fixedly secured in vertically and axially depending relationship to the platform 12 by any suitable means such as bolts 26 extending through the platform to secure the blade 24 along a side edge 28 of the platform. It will, however, be understood that other means for securing the blade to the platform may be used such as, for example, an angle bracket for the blade adapted to be fastened to the bottom of the platform. The blade 24 defines a top edge 29 and a sharpened lower edge 30 which extends in a preferably arcuate or slightly convexly bowed configuration from a front edge 32 of the blade, and thereupon extends rearwardly upwardly at a predetermined angle to the bottom surface 34 and in predetermined spaced relation to the rear edge 18. Thus a line extended parallel to the bottom surface 34 from the front end of the edge 30 would intersect the edge 30 at a point adjacent the rear of the blade, so that the major portion of the blade affords a cutting depth at least equal to the depth of the substantially vertical front edge 32 of the blade. It will, therefore, be appreciated that a full cutting action is thereby afforded which reduces the number of individual cuts which must be made to edge a given length of lawn. The arcuately formed rear edge 18 of the platform 12 cooperates with the forwardly placed handle 14 to permit the edger 10 to be pivoted or rocked rearwardly with the rear edge 18 serving as a pivot point, and the upwardly arcuate rear portions of the blade edge 30 are adapted to assist in affording this result. In order to facilitate subsequent forward movement of the edger, a roller or small wheel means 36 is journalled by suitable means to the bottom surface 34 of the platform adjacent the rear edge 18 thereof and substantially at the point where the rounded or arcuate edge 18 meets the surface 34. Thus, although the contour of the rear edge 18 is such as to permit its use as a skid in affording ready forward movement of the edger, after it has been tilted rearwardly as described, the wheel means 36 serves to eliminate frictional drag, and the dimensions and mounting of the wheel means may be such as to cooperate with the edge 18 in supporting the edger at such time, or, alternatively, may afford full support for the edger during the said forward movement thereof.

Because of the angle at which the edger is positioned during such forward movement, little or no interference will be encountered from the ground as has been the case with previously available cutters, and the bottom surface 34 of the platform will be substantially elevated relative to the ground. In order to assist in raising the platform to its angular or tilted position, a spring element 38, preferably of a helical type, is secured to the bottom platform surface 34 adjacent the forward edge 16 of the platform, and preferably slightly in advance of the position of the handle 14. Thus when foot pressure on the platform is eased, the edger will automatically tilt to the desired position, the length and compression force of the spring 38 being suited to the particular construction of the edger.

In operation, therefore, the user grasps the handle structure 22 and places his foot upon the top surface 23 of the platform 12. He then presses downwardly with his foot and also, if desired, by means of the handle to insert the blade into the ground. Thereupon he eases the foot pressure on the platform 12 so that the spring 38 may pivot the platform about its arcuate rear edge 18 to a predetermined acute angle relative to the surface being cut as shown more particularly in Figure 3. Of course, manual control of this action is also afforded by the handle 14.

After the platform has thus been rocked to the position shown in solid lines in Figure 3, it is then rolled forward by means of the roller or wheel means 36, and the edge 18, if desired, the handle 14 and the platform 12 affording control means to maintain the desired angular position of the platform at such time, with the forward component of pressure preferably being applied by the user's foot. As stated, the forward movement may be relatively greater than with conventional edgers because a desirable cutting depth is provided for a major portion of the length of the blade; and once the edger has been moved forward as described, the entire process is repeated.

There has thus been provided a lawn edger which is self-guided and which requires little effort in use as compared with previously available edgers, as a result of the easy "rock and roll" movement afforded thereby. The device is simple in construction and may be made of conventional materials so that manufacturing costs are minimized, and advantageously adapted for use in any situation where edging is required.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A lawn edger comprising a blade having an arcuate lower edge portion, a platform supporting said blade and extending rearwardly a predetermined distance beyond the blade and a handle secured in perpendicular, upstanding relationship to said platform and spaced from the rear edge of said platform a distance such that the platform provides a foot rest, the rear edge of the platform extending perpendicularly to the blade and having an arcuate configuration so that the platform may be pivoted by the handle upwardly therearound and the edger moved forwardly with said rear edge providing a skid.

2. A lawn edger comprising a platform, a blade secured in depending relationship to said platform and having a rear edge portion intersecting the platform a predetermined distance from the rear edge of said platform, the rear edge of said platform extending perpendicularly to said blade and having an arcuate configuration, an upstanding handle secured to said platform adjacent the forward end thereof, and a wheel secured to said platform in depending relationship between the intersection of the blade and the platform and said rear edge of the platform, said wheel having a size such that the edger can be rocked out of the ground during use with the rear edge serving as a pivot point and moved forwardly by rolling the edger on said wheel.

3. A lawn edger comprising a platform, a blade secured in depending relationship to said platform and having a rear edge portion intersecting the platform, the rear edge of said platform extending perpendicularly to said blade, an upstanding handle secured to said platform adjacent the forward end thereof, and a wheel element secured to said platform in depending relationship between the intersection of the blade and the platform and the rear edge of the platform, said wheel having a size such that the edger blade can be rocked out of the ground during use by means of said handle with the rear edge serving as a pivot point and the edger moved forwardly by rolling the platform on said wheel, said rear edge having an arcuate configuration to cooperate with the wheel in sliding the edger forwardly with the platform inclined at a predetermined angle to the ground such as to keep the blade from cutting during forward movement.

4. A lawn edger comprising a platform, a blade secured in depending relationship to said platform and having a rear edge portion intersecting the platform a predetermined distance from the rear edge of said platform, an upstanding handle secured to said platform adjacent the forward end thereof, a wheel element secured to said platform in depending relationship between the intersection of the blade and the platform and the rear edge of the platform and having a size such that the edger can be rocked out of the ground during use with the rear edge serving as a pivot point and moved forwardly with the blade resting on the ground or disengaged from the ground by rolling the platform on said wheel, said rear edge having an arcuate configuration to cooperate with said wheel in sliding the edger forwardly with the platform inclined at a predetermined angle to the ground such as to keep the blade from cutting during forward movement, and a spring secured beneath the platform adjacent the forward end thereof and forwardly of the location of the handle, said spring being adapted to be compressed during pivotal downward movement around said rear edge in placing the blade into cutting relation with the ground and to cooperate with the handle in pivoting the blade and platform upwardly around the pivot point provided by said rear edge during removal of the blade from the ground.

References Cited in the file of this patent

UNITED STATES PATENTS

| | | |
|---|---|---|
| 2,503,757 | Morgan | Apr. 11, 1950 |
| 2,506,371 | Lint | May 2, 1950 |
| 2,568,468 | Smith | Sept. 18, 1951 |